United States Patent Office 2,861,655
Patented Nov. 25, 1958

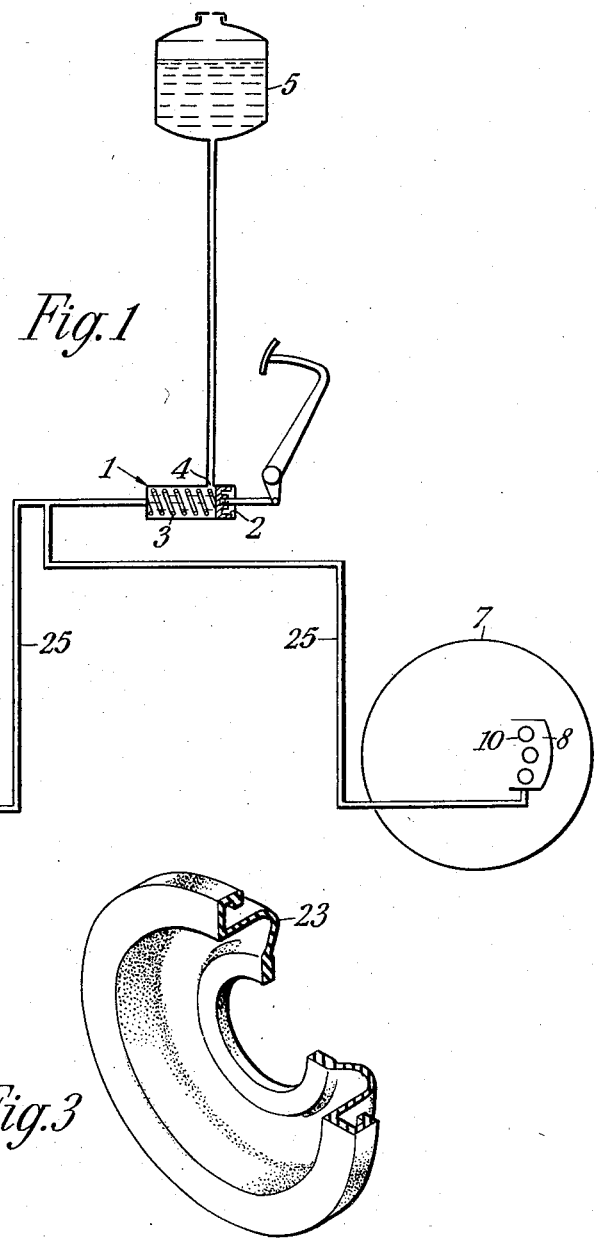

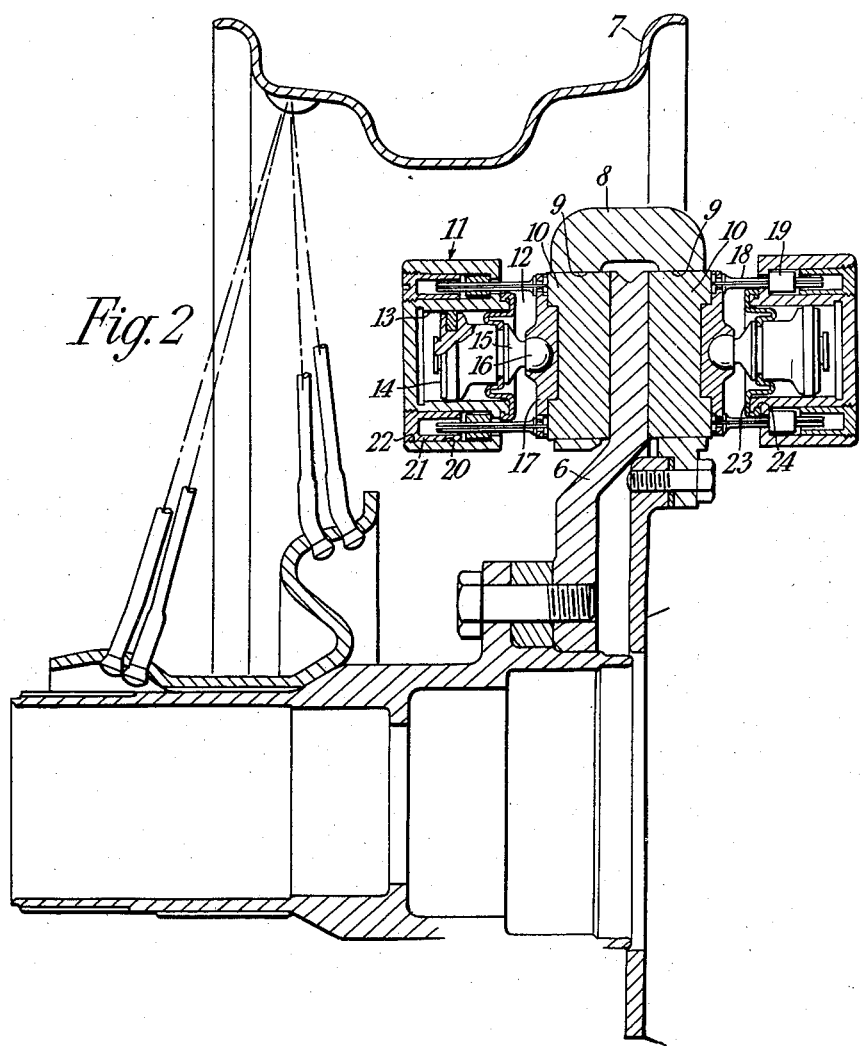

2,861,655

HYDRAULIC BRAKING SYSTEM

Henry James Butler, Sutton Coldfield, England, assignor to Dunlop Rubber Company Limited, London County, England, a British company Application December 8, 1954, Serial No. 473,921

Claims priority, application Great Britain December 10, 1953

8 Claims. (Cl. 188—73)

This invention relates to a hydraulically-operated braking system and more particularly relates to such a system incorporating disc brakes.

Hydraulic braking systems for motor vehicles are known comprising a foot-pedal operated master-cylinder connected to a liquid reservoir and to the operating mechanisms of the wheel brakes. The arrangement is usually such that the liquid reservoir is situated above the levels of the brake operating mechanisms, and a passage between the master-cylinder and reservoir is uncovered when the brake is idle, with the result that the static head of hydraulic liquid in the system exerts a force on the plungers of the brake operating mechanisms which moves or tends to move the friction pads or shoes into light rubbing engagement with a rotatable braking member connected to each wheel.

It is not an advantage to have this rubbing engagement when the brake is idle. For one thing it causes an appreciable loss in brake horse power at speed and for another the wear of the friction pads is considerably increased. The braking members do not have a chance to cool down when the vehicle is running and this can affect the life of said members, and it also promotes brake fade. This criticism applies also to vehicle brake servo-systems where there is a residual pressure within the system.

My invention provides a hydraulic braking system, particularly a hydraulic braking system for vehicles, wherein rubbing of the non-rotatable friction members against the rotatable member is prevented when the brake is idle.

According to my invention a hydraulic braking system comprises a rotatable braking member, friction material to frictionally engage said member, a hydraulically operated brake applying means, means whereby the brake applying means is biassed in a brake applying direction when the brake is idle, means which exert frictional opposition to said biassing means, and spring or like means to overcome said biassing means and move the brake-applying means in the opposite direction.

According to the invention also a hydraulic braking system comprises a rotatable disc, pads of friction material to frictionally engage at least one side thereof, a hydraulically-operated plunger and cylinder mechanism for effecting said engagement, means when the brake is idle, to exert a force on said plunger in the brake applying direction, means which exert frictional opposition to said force, and spring or like means to overcome said force and move said plunger in the opposite direction. The biassing means comprises the static head of hydraulic liquid which, when the brake is idle, exerts a brake-applying force on the plunger of the brake-applying means.

Preferably said spring or like means comprises an annular moulded rubber or rubber-like cap fitted between the cylinder and the plunger to prevent dirt and moisture from entering the cylinder. The cap is so designed, and when fitted is so arranged, that it exerts a greater force on the plunger than, and in the opposite direction to, the force exerted by the static head of hydraulic liquid.

Preferably also the brake is a disc brake and is provided with mechanisms for controlling the withdrawal of the friction material from the disc to a predetermined distance only when the braking pressure is relieved.

The invention will now be described with reference to the accompanying drawings of which:

Figure 1 is a diagrammatic representation of a hydraulic braking system to which the present invention may be applied, Figure 2 is a sectional view of the brake illustrated diagrammatically in Figure 1, Figure 3 is a part-sectional perspective view of a resilient dust-cap constructed to overcome said biassing means.

The hydraulic braking system for vehicles shown in Figure 1 comprises a master-cylinder 1 having a foot-pedal operated piston 2 slidable therein against a return spring 3. A port 4 in the cylinder wall is connected to a reservoir 5 containing hydraulic liquid and open to atmospheric pressure. The port 4 is so positioned that initial movement of the piston 2 will seal off the port 4 so that further movement will pressurize the liquid in the cylinder and in the system.

The brakes (Figure 2) each comprise an annular disc 6 secured to and rotatable by a vehicle wheel 7. Secured to a non-rotatable part of the wheel assembly is a caliper 8 which straddles a minor portion only of the outer periphery of the disc 6. The two limbs of the caliper 8, one adjacent each radially-extending face of the disc 6, are each provided with a plurality of axially-extending holes 9 in which pads of friction material 10 are axially slidable. A cylinder block 11 is secured to each limb of the caliper through spacing members (not shown) so that an air gap 12 is provided between said block 11 and the adjacent limb of the caliper 8, and the block 11 is provided with a plurality of cylinders 13, each cylinder being axially-aligned with a hole 9 in the caliper 8. A plunger 14 is fluid-tightly slidable in each cylinder 13, said plunger 14 being provided with an extension 15 extending axially therefrom towards the disc 6. Said extension 15 is provided with a part-spherical member 16 which seats in a complementary seating in a backing plate 17 secured to each friction pad 10. Located on each side of each cylinder is a mechanism which comprises a tubular pin 18 flanged at one end and longitudinally slotted along its length. The flanged end of the pin 18 is associated with the backing plate 17 which is secured to the friction pads 10. The pin 18 by virtue of its slot, is inwardly springy, and a cylindrical sleeve 19 is fitted over the pin and in high frictional engagement therewith. The pin 18 and sleeve 19 extend axially through a hole 20 alongside the cylinder 13, the axis of the hole 20 being parallel to the axis of the cylinder 13. The hole 20 is stepped, the smaller diameter end thereof being adjacent the disc 6, and is internally threaded for a short distance inwardly from the end thereof remote from the disc, and a hollow plug 21 closed at one end is located in the hole 20 being secured therein by means of a threaded portion 22 which engages with the threaded portion of the hole 20. Thus axial movement of the sleeve 19 in one direction is limited by the step formed in the hole 20 and in the other direction by the end of the plug 21.

In operation, if friction pad wear takes place, the pin 18 is drawn through the sleeve 19 when said sleeve, engages the step in the hole 20 on the application of braking effort and the sleeve 19 thus assumes a new position relative to the pin 18. On relief of braking effort, the sleeve 19 moves with the pin 18 to abut the plug 21 and thus restrict the movement of the friction pad 10 away from the disc 6.

To prevent moisture, dirt and the like from entering the bore of the cylinder an annular rubber or rubber-like cap 23 (Figure 3) is provided, the outer periphery being clipped into an annular groove 24 provided adjacent the open end of the cylinder 13 and the inner periphery being clipped into a recess formed in the extension 15. The annular cap 23 is constructed to allow for wear of the friction pad.

The space between each plunger 14 and the base of its associated cylinder 13 is connected, by means of pipe lines 25 (Figure 1), with the output side of the master-cylinder 1. The master-cylinder and reservoir 5 are normally situated at a level higher than the brake operating mechanisms and hence when the brake is idle and the system is open to atmospheric pressure there is a force acting on the plunger 14 of each mechanism which tends to force it inwardly and to move the associated friction pad 10 into rubbing engagement with the disc 6.

To overcome this undesirable force the annular cap 23 is made of moulded rubber or rubber-like material and is so designed and, when fitted, is so arranged that it will exert a slightly greater force on the plunger 14 in the opposite direction to that exerted by the static head of hydraulic liquid. For any particular installation the maximum force due to said static head is easily calculated and the moulded cap 23 is designed and arranged to provide a slightly greater force in the opposite direction which tends to move the plungers 14 and hence the backing plates 17 and friction pads 10 away from the disc 6. Movement of the pads 10 in this direction more than a predetermined amount is prevented by the sleeve 19 abutting the end of the plug 21.

The force provided by the annular cap 23 may be provided, or supplemented in an alternative construction, (not illustrated), by a spring, either in tension between the plunger 14 and the base of the cylinder 13, or in compression between the plunger 14 and an abutment adjacent the open end of the cylinder.

In the constructions described above friction pad withdrawal is effected by the rubber cap 23, or spring, as the case may be, or possibly by their combined effort.

Having now described my invention, what I claim is:

1. A hydraulic braking system comprising a rotatable braking member, friction material to frictionally engage said braking member, hydraulically operated brake applying means comprising piston and cylinder elements one being fixed and the other connected with said friction material to move said friction material to and from contact with said braking member, means to provide a static head of hydraulic fluid to said piston and cylinder mechanism when said mechanism is in an inoperative position, spaced opposed limit stops mounted on the fixed one of said elements, an elastically deformable pin movable with said friction material, a sleeve held in frictional engagement with said deformable pin between said spaced opposed limit stops to move with said pin until stopped by one of said limit stops and a resilient diaphragm connected with said piston and the adjacent end of said cylinder, said diaphragm being biased with sufficient force to urge said piston away from said friction material against said static head of hydraulic liquid until said sleeve is stopped by the other limit stop when the piston and cylinder mechanism are in their inoperative condition.

2. The hydraulic braking system of claim 1 in which the resilience of said diaphragm is of lesser value than that of the frictional engagement between said sleeve and said elastically deformable pin.

3. The braking system of claim 2 in which said diaphragm is sealed to said piston and cylinder to prevent moisture and dirt from entering said cylinder.

4. The hydraulic braking system of claim 1 in which said spaced opposed limit stops are mounted on said cylinder.

5. A hydraulic braking system comprising a rotatable brake disc, a caliper having arms enclosing opposite sides of said disc for a limited portion of the area of rotation of said disc, a friction block on at least one side of said disc guided by an arm of said caliper to move axially to and from the opposed side of the said disc and held from movement about the axis of rotation of said disc, a cylinder mounted in fixed position on said arm of said caliper coaxial with said friction block, a pair of stops fixed on said cylinder and spaced apart axially of said cylinder, a piston in said cylinder connected to said friction block and movable to move said friction block to and from frictional engagement with said disc, an elastically deformable pin mounted on said friction block assembly and extending axially of said piston and cylinder adjacent to said pair of spaced stops, a sleeve mounted in frictional engagement on said pin between said stops and a resilient diaphragm connected with said piston and said cylinder to be deformed by relative movement between said piston and cylinder and being biased by such deformation to move said piston and friction block from said disc until said sleeve is stopped by one of said stops.

6. The hydraulic braking system of claim 5 having means to supply fluid to said cylinder under a static head and in which said resilient diaphragm is biased with sufficient force to overcome said static head but insufficient to displace said sleeve on said elastically deformable pin.

7. The hydraulic braking system of claim 5 in which said cylinder is mounted in spaced relation to said caliper.

8. The hydraulic braking system of claim 5 in which at least one piston, cylinder and friction block assembly is mounted on each arm of said caliper.

References Cited in the file of this patent

UNITED STATES PATENTS

| | | |
|---|---|---|
| 957,347 | Kennedy | May 10, 1910 |
| 1,875,095 | Milan | Aug. 30, 1932 |
| 2,358,740 | Scott-Iversen | Sept. 19, 1944 |
| 2,657,772 | Chamberlain | Nov. 3, 1953 |
| 2,736,396 | Rasmussen et al. | Feb. 28, 1956 |
| 2,749,757 | Adelt | June 12, 1956 |
| 2,762,461 | Naumann | Sept. 11, 1956 |

FOREIGN PATENTS

| | | |
|---|---|---|
| 49,209 | France | Dec. 7, 1938 |